Aug. 12, 1969     O. L. SARLANDT     3,460,260
GRADE SETTER
Original Filed Oct. 21, 1965     3 Sheets-Sheet 2
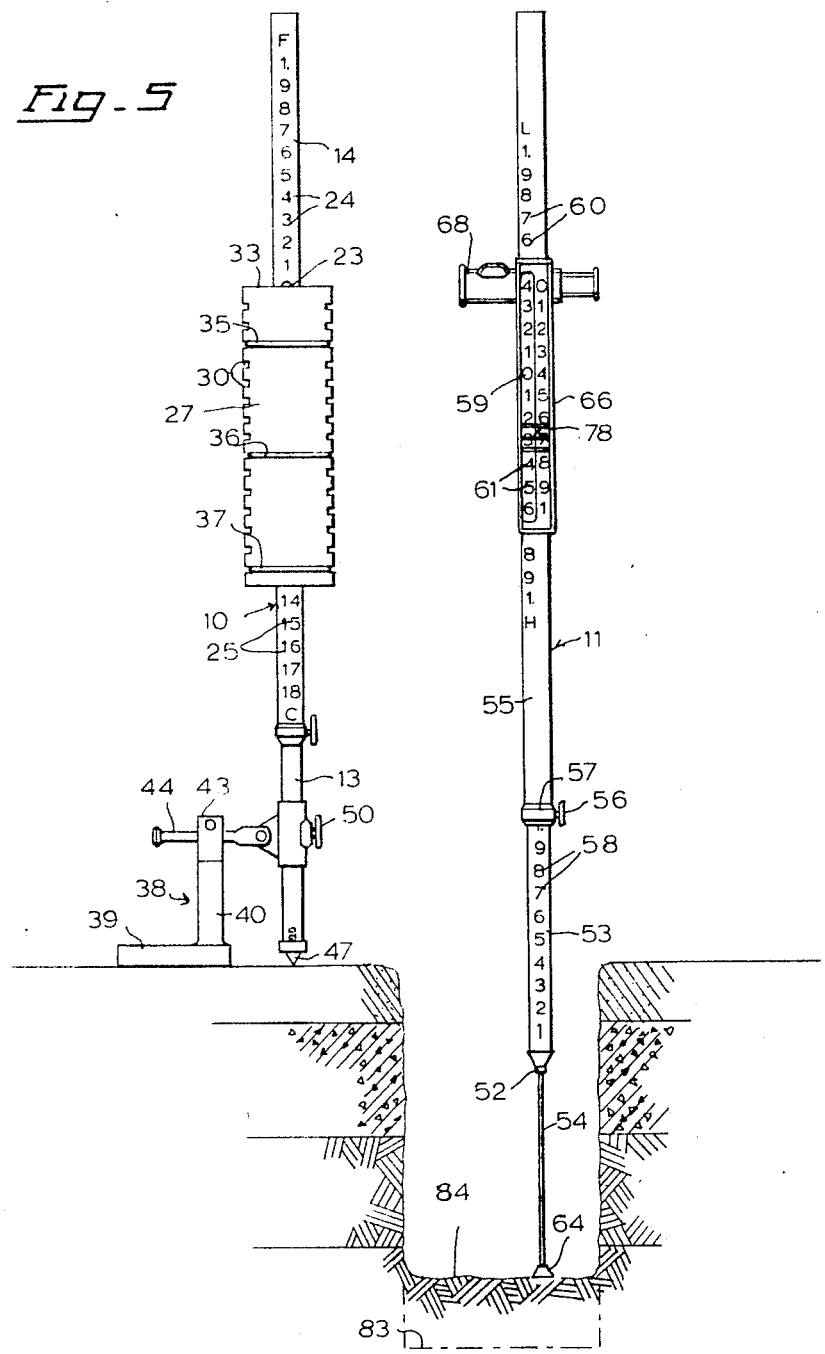
INVENTOR.
OSCAR L. SARLANDT
BY Baysen, Mohler, Foster & Schlemmer
ATTORNEYS Aug. 12, 1969
O. L. SARLANDT
3,460,260
GRADE SETTER
Original Filed Oct. 21, 1965
3 Sheets-Sheet 3
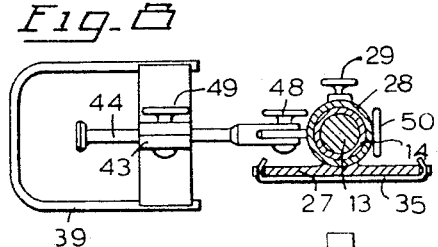
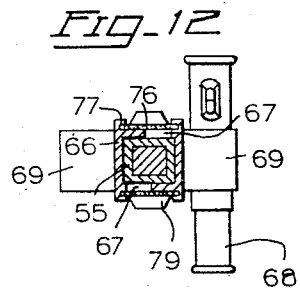
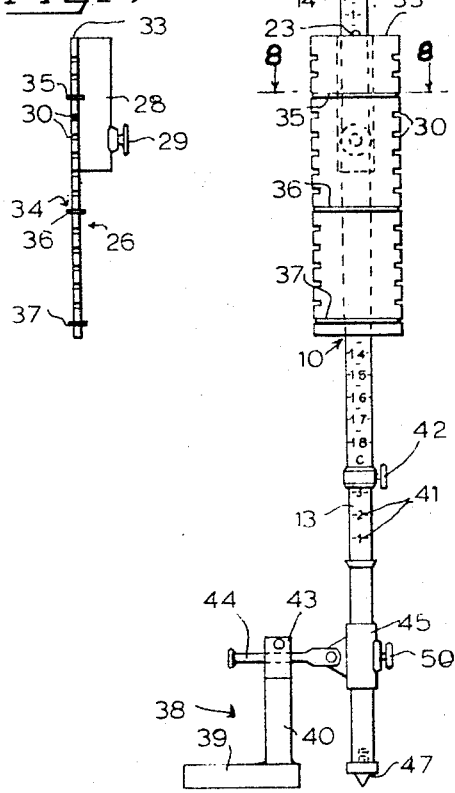
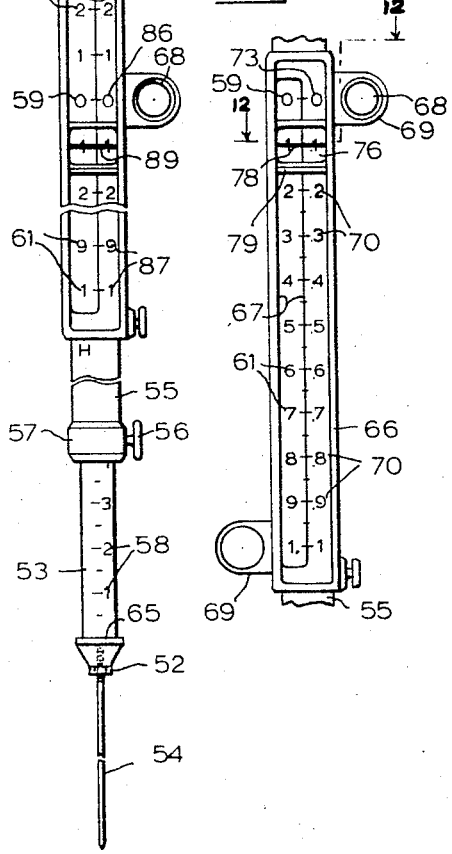
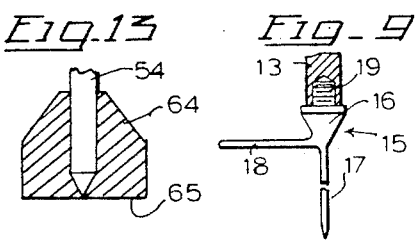
INVENTOR.
OSCAR L. SARLANDT
BY
*Boyken, Mohler, Foster & Schlemmer*
ATTORNEYS

United States Patent Office

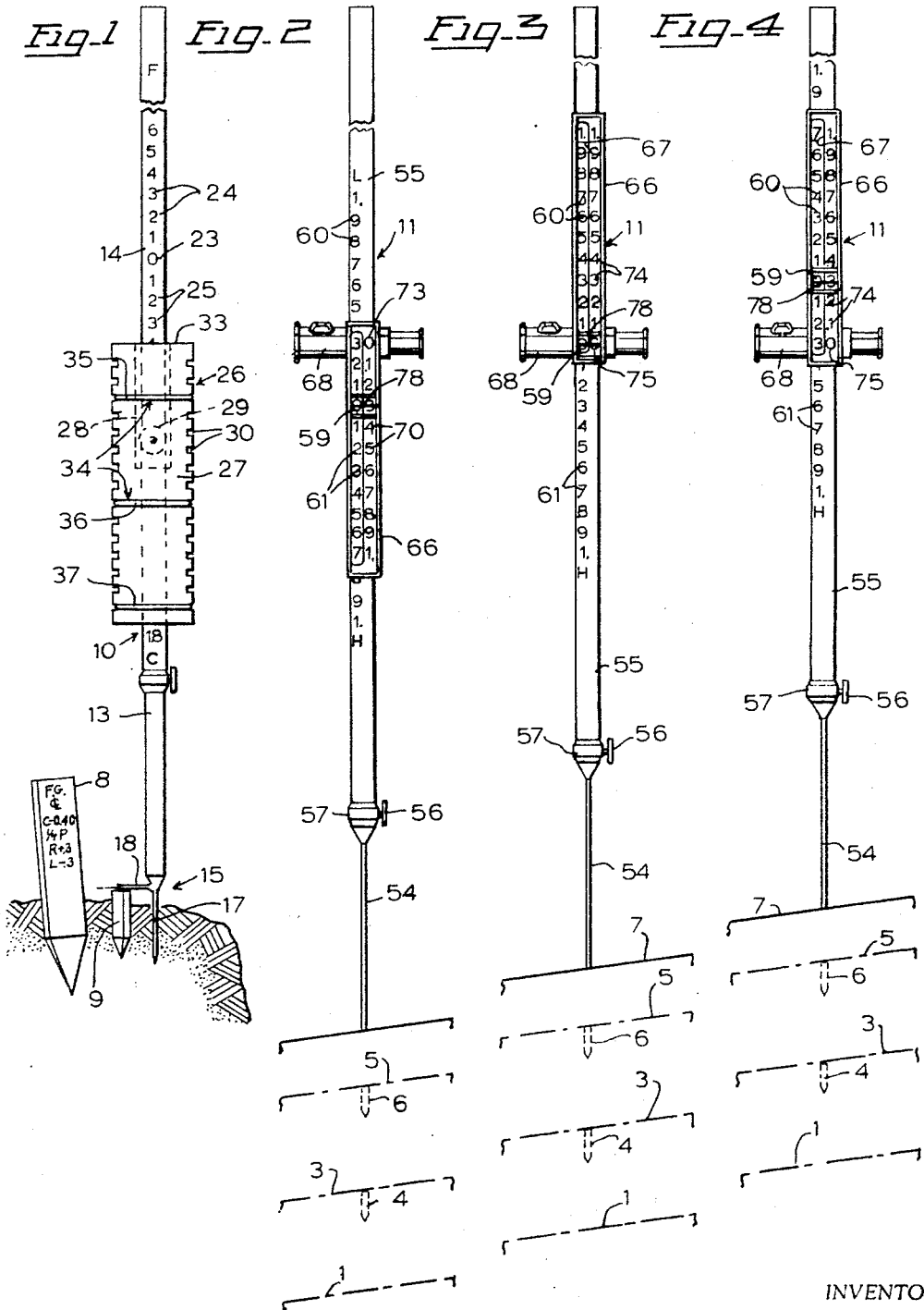

3,460,260
Patented Aug. 12, 1969

3,460,260
GRADE SETTER
Oscar L. Sarlandt, 1647 Abranson Road,
Santa Rosa, Calif. 95401
Continuation of application Ser. No. 499,265, Oct. 21,
1965. This application May 10, 1968, Ser. No. 728,365
Int. Cl. G01c 9/00
U.S. Cl. 33—73                                   5 Claims

ABSTRACT OF THE DISCLOSURE

A traget which carries markers at selectable levels is settable along a rod having oppositely progressing scales with a common zero at a predeterminable distance above the foot of the rod. Similar scales are provided on each of two opposite faces of a second rod. A slide thereon mounting a horizontal telescope has on one face a scale progressing downwardly from an upper telescope holder and on the other face a scale progressing upwardly from a lower telescope holder. Each face carries a cursor for correlating the slide scale with the adjacent rod scale seen through a longitudinal window.

---

This application is a continuation of application S.N. 499,265, filed Oct. 21, 1965, now abandoned.

This invention relates to apparatus for use in determining variations in grade levels.

One example is in road, street, or highway construction. At the present time in the procedure of preparing a street or road for paving, stakes called "cut stakes" are driven alongside the road or highway that is being constructed or repaired and on each cut stake is data, such as "cut 0.4" or "fill 0.4," meaning that the center of the roadway is to be graded down to a level, or filled to a level that is 0.4′ below, or above, the upper end of a "hub stake" that, in turn, is in the ground adjacent to each cut stake. The cut stakes may also carry a symbol, such as "R 0.3" or "L—0.3" referring to the right quarter or left quarter points on the grade to be formed, which would be points in alignment with each other transversely of the highway, and with the associated center point. These levels may be referred to as "horizontal planes."

In a completed paved highway, normally three levels must be determined. The level of the lime treated base may, for example, be six inches above the soil, and the level of the concrete may be six inches above the level of the lime treated base, while the level of the pavement may be three inches above that of the concrete. In a road or highway of say fifty foot width, usually six pegs are driven, three being at the desired height of the lime treated base and three at the desired height of the concrete, the pegs of each group of three being respectively at the center and quarter points.

These levels have heretofore been mathematically calculated, which is a time consuming operation subject to many chances for error. The information on the cut stake is used to establish the contour of the finished grade. To establish the contour of a base, distances of the surfaces of bases below the finished grade are added algebraically to the vertical dimensions recorded on the cut stake which, in turn, are used to establish the contour of the finished grade.

By the present means the operation is rapid and free from errors of calculation.

One of the main objects of the present invention is the provision of improved means for quickly and accurately determining variations in the actual level at a predetermined point relative to the desired level at said point, whether the level is above or below the desired level, and another object is the provision of a method of determining such variation.

An added object of the invention is the provision of improved means for determining variations in the actual upper surface levels of points in the ground relative to a fixed reference point and the exact amount of such variation and which means eliminates the necessity for mathematically computing said variations.

Other objects and advantages will appear in the drawings and description.

In the drawings:

FIG. 1 is a side elevational view of one of the members of the invention that is illustrated in position at one side of a highway in engagement with a hub stake.

FIGS. 2, 3 and 4 are corresponding side elevational views of the other member of the invention than the one shown in FIG. 1 in three different positions for driving the pegs so their upper surfaces will be at the desired levels relative to the upper level of the hub stake, the said desired levels and pegs being indicated in dot-dash lines, with the uppermost pavement level being in full line.

FIG. 5 is a side elevational view showing a midification of the members of FIGS. 1, 2 in which a desired level below that of the upper surface of the ground is to be determined.

FIG. 6 is a side elevational view of one of the members of FIG. 5 extended.

FIG. 7 is a side elevational view of a portion of the member of FIG. 6.

FIG. 8 is an enlarged cross sectional view along line 8—8 of FIG. 6.

FIG. 9 is a fragmentary enlarged part sectional and part elevational view of the lower end of the member of FIG. 1 shown in a position below FIG. 6 and which structure may be substituted for the structure on the lower end of the member shown in FIG. 6.

FIG. 10 is a side elevational view of a member that is a modification of the member shown in FIG. 2.

FIG. 11 is a fragmentary cross sectional view of a portion of the member shown in FIGS. 2–5 but with the viewing glass at a right angle to the position shown in FIGS. 2–5.

FIG. 12 is a cross sectional view taken along line 12—12 of FIG. 11.

FIG. 13 is a cross sectional view of a cap that is adapted to be used on the lower end of the member shown in FIG. 10.

Referring to FIGS. 2, 3, 4, the dot-dash line 1 indicates the hard, soil base, and the dot-dash line 3 indicates the desired upper level of the lime treated base. Normally the soil above the base 1 is cultivated with lime and is then packed to the desired level 3. It is desirable that the thickness of the lime treated base be accurate which, of course, means that the grade of the soil level be accurately determined. As will appear, the present devices are used for this purpose as well as for setting the other grade levels.

The pegs for the level of the lime treated base are at 4. Dot-dash line 5 is the desired level of the concrete, and 6 is a peg. The full line 7 is the pavement level, and normally no pegs are used at this level, which is approximately three inches above level 5.

If the desired level is below the existing surface, the peg may be in a recess in the existing soil or material.

Approximately every fifty feet along the highway, longitudinally thereof, there will be six pegs, or three for each level of the lime treated base and the concrete. FIGS. 2–3 are arranged on the sheet to indicate the six pegs, although the views are separate on the sheet.

Heretofore, as stated, the above levels have been mathematically calculated.

Referring to FIG. 1, a cut stake is indicated at 8. The data shown on this stake relates to the finished level, or pavement level at the center point, since the other levels are known constants with respect to the finished level. As already noted, the level of the concrete may be three inches below the finished level, and the level of the lime treated base may be six inches below the concrete level, while the soil level may be six inches below the level of the lime treated base. These distances are normal examples, and obviously may vary, and insofar as this invention is concerned, it may be used for only one base, below a finished level or any desired plurality below such level.

Adjacent to the cut stake is a hub stake 9. The upper surface of the hub stake constitutes a fixed reference point where the plane of the desired finished level differs from the surface level of the ground at the cut stake. The symbol C—0.40 shown on the hub stake indicates that the desired finished center point is 0.40' below the top of the hub stake.

The device shown in FIG. 1 will be called the "target device," and is generally designated 10. The target device is the device of the combination on which sightings are taken, while the device shown in FIG. 2 may be called the "sighting device" and is generally designated 11.

The target device shown in FIG. 1 comprises a vertical, lower rod 13 that telescopically extends into an upper, hollow vertical rod 14. A probe or base element 15 is secured to the lower end of the lower rod 13, which base element comprises a body portion 16 (FIG. 9) having a vertically downwardly extending pin 17 thereon, and a lateral projection 18 rigid with said body at approximately the juncture between the pin 17 and body 16. A threaded shank 19 projecting upward from body 16 is threaded into the lower end of rod 13.

In operation, the probe or pin 17 is thrust into the ground alongside the hub stake so that projection 18 will engage the upper surface of the hub stake. The top surface or level of the upper end of the hub stake is a fixed reference point a known distance from the plane of the desired finished surface, and it is apparent that the distances on the target device above the projection 18 will be related to the fixed reference point.

A lateral surface of upper rod 14 is marked with a zero index 23 and equally spaced graduations or numerals 24 are on the upper rod above the index 23 while similarly spaced numerals 25 are below the zero index 23. The numerals 24 are of successively greater value in direction upwardly from the zero index, and are successively greater extending downwardly from said index. The figures employed in the example may be in ten hundredths of a foot, although the decimal point may not be shown, as in the drawing.

The distance of the zero index above the probe is arbitrary although predetermined to provide a datum point a fixed distance above the upper surface of the hub stake, and it preferably may be from three to four feet for convenience in sighting horizontally by a standing person. The scale 24 may be designated the "fill" scale, while the scale 25 may be designated the "cut" scale, as seen by the letters F and C at the upper and lower ends of the pair of scales 24, 25.

Slidably supported on the vertical rod 14 is what may be called the target, and which is generally designated 26. This target comprises a vertically elongated plate 27 and includes a vertical sleeve 28 through which rod 14 slidably extends. A finger actuatable screw 29 threadably extends through a side of sleeve 28 and into engagement with rod 14 for releasably securing the sleeve, and consequently the target 26, in the desired adjusted position on the rod.

Opposite vertical edges of the plate 27 are notched at equally spaced points, as at 30, which notches may be an inch apart, as an example. These notches start from the upper horizontal edge 33 of the plate 27, the uppermost notches along said opposite edges being one inch from said upper edge of the plate, and the notches are in alignment horizontally. Horizontal spring clips generally designated 34 are adapted to be sprung at their ends into horizontally aligned pairs of said notches. The face of plate 27 across which the horizontal strip of each spring clip extends may be white, while each clip may be black, or any other combination may be used provided there is a good contrast so the spring strips will be clearly visible.

Where the present invention is used for highway grades there may be three clips, the upper clip 35 being held in the third pair of notches from the upper edge 33 while the next clip 36 is held in the sixth pair of notches below clip 35, or six inches below clip 36, and the third clip 37 is in the sixth pair of notches below clip 36. It will be seen that the spacing between the clips corresponds to the different levels of the soil, lime base, and concrete, while the uppermost edge of the target would correspond to the distance of the desired finished level above the clip 35.

The modification shown in FIGS. 5, 6 varies from the target device of FIG. 1 in that a support generally designated 38 is substituted for the probe 15. This support has a base member 39 (FIGS. 6, 8) that is adapted to be supported on the ground or a paved area, and it includes an upright 40, the upper end of which carries a clamp 43 through which a horizontally extending rod 44 extends. This rod is pivotally connected at one end to a sleeve 45 that, in turn, is releasably clamped to the lower end of rod 13 having a pointed lower end member 47 that is screwed into the lower end of rod 13 instead of the probe 15. The pivotal connection between rod 44 and sleeve 45 may be tightened by a finger actuatable screw 48 (FIG. 8) and a similar screw 49 releasably secures rod 44 to clamp 43. A screw 50 adjustably secures the sleeve 45 to rod 46.

As seen in FIG. 6, the rod 13 is extensible and carries graduations 41 thereon which are in uints of length to indicate the degree of extension of the rod from the collapsed position shown in FIGS. 1, 5. A screw 42 is adapted to hold the rod 13 collapsed or at any desired extension. The said screw 42 is common to the target device shown in all views.

Referring to the sighting device 11, said device comprises a vertical lower rod 53 (FIG. 5) that may include a probe 54 (FIGS. 5, 10) in downward continuation thereof. This probe is threaded into the lower end of rod 53 to be replaceable when worn at its lower end. In FIGS. 2–4 the body of rod 53 is fully telescoped within an upper hollow, vertical rod 55, while in FIGS. 5, 6 and 10 it is partially extended. A finger actuatable screw 56 threadedly extending through a reinforcing band 57 on the lower end of upper rod 55 is adapted to engage said lower rod when tightened, for releasably securing said lower rod in the desired adjusted position relative to the upper rod. A lock nut 52 secures probe 54 in the desired degree of extension relative to rod 53 (FIG. 5).

Rods 53, 55 are preferably square in cross sectional contour, and on one or more sides of the lower rod, commencing from lower end thereof is a scale 58 that includes equally spaced digits of successively increasing value in an upward direction. Thus, the greater the downward extension of rod 53 relative to rod 55 the greater the indicated value at a reading line defined by the lower end of rod 55. In FIGS. 2–4 rod 53 is in fully collapsed position.

The upper rod 55 has a zero index 59 at the same level on one or more sides and equally spaced graduations 60 or numbers of successively increasing value extend upwardly from the zero index 59 while equally spaced graduations or numerals 61 of successively increasing value extend downwardly from the zero graduation. The zero index 59 is placed to provide a datum point at a distance above the soil level, as determined by the lower end of the probe 54 with the rod 53 in fully collapsed position, equal to the predetermined distance of the zero index 23 above the upper surface of the hub stake. In soft earth it may be preferable that a base member 64 (FIGS. 5, 13) be fitted over the lower end of the probe to provide a flat horizontal lower surface 73 (FIG. 13) that is even with the lowermost end of the probe and that may engage the upper surface of the ground without penetrating thereinto.

The scale 61 may be designated the "high" scale, while scale 60 may be designated the "low" scale, as seen by the letters H and L at the lower and upper ends of the pair of scales 61, 60 (FIGS. 2, 5, 10).

In FIGS. 2, 5, and 11 a vertically elongated sleeve 66 is vertically slidable on rod 55 and it is formed with a vertically elongated window 67 through which scales 60, 61 may be read according to the position of the sleeve 66 on the rod.

This sleeve 66 is a level holder for a conventional sighting level 68 that may be secured to one end or the other thereof.

FIGS. 11, 12 show the actual structural arrangement that is used in connection with FIGS. 2–4 and 5. In FIGS. 2–4 and 5 the viewing telescope is indicated at a right angle to the sides of the rod 55 as shown in FIGS. 11, 12 in order to clearly show in FIGS. 2–4 and 5 the use of the telesecope with the graduations 60 and 61 including the zero index, and also the target device 10 would actually be facing the telescope in each of FIGS. 2, 3, 4 and 5.

In FIG. 11 it is seen that a person using the telescope would, at substantially the same time, be able to view the graduations 60, 61 since they are in the side facing the viewer. In FIGS. 2, 11, 12 the telescope 68 is at the upper end of sleeve 66, while in FIGS. 3, 4 it is at the bottom of the sleeve. Holders 69 (FIGS. 11, 12) are provided at the upper and lower ends of the sleeve, and at opposite sides respectively for holding the telescope.

The side of the rod 55 that is opposite to the side shown in FIG. 11 may carry the same zero index and graduations 60, 61 at exactly the same levels as shown in FIG. 11, hence they are also designated 60, 61, as seen in FIGS. 3, 4.

In FIGS. 2 and 11 a vertical row of graduations 70 is on the sleeve 66 alongside window 67, which graduations are of the same value and spacing as those of scale 61 commencing with a zero index 73 at the upper end of the row. The graduations used are preferably in tenths of a foot, starting with .1 at the upper end of the row below the zero index and terminating at the lower end in the numeral 1, which would be one foot below the zero index.

On the opposite side of the sleeve the same to that shown in FIGS. 2 and 11, the arrangement of numerals or graduations are shown in FIGS. 3, 4 as at 74, except that the zero index, designated 75, is at the bottom of the sleeve and the value of the graduations progressively increase upwardly. This scale is used when the use of the device requires the telescope in the lower holder 69.

It has been pointed out that window 67 on each opposite side of the sleeve permits the scales or graduations 60, 61 including the zero index 59 to be seen. Also, the opposite sides of the sleeve 66 are open so that scales 70, 74 and zero indexes 73, 75 may be seen, and glass or transparent slides 76, shown as of a height sufficient to frame a scale digit, are vertically slidable in oppposedly facing vertical grooves 77 (FIG. 12) on sleeve 66, which slides extend across windows 67 and the graduations on the sleeve so that all graduations at each side of the sleeve and rod 55 may be viewed through one window or the other. A horizontal line 78 or indicator is on each slide 76, hence the slide including the indicator may generally be called an indicator.

A lip 79 on the bottom of each indicator may facilitate finger movement of the indicator.

In operation as a grade setter for setting the stakes 4, 6, in FIG. 1 the target device is positioned vertically alongside the hub stake with the lateral projection 18 in engagement with the top of stake 9.

If there is no variation between the level of the ground or pavement alongside the road or grade and the level of the center point of the latter, the supporting member 38 of FIGS. 5, 6 may be used instead of the probe.

The stake bears the notation C—0.40 which means that the desired center point of the grade is 0.40 feet below the top of the hub stake 9, hence the target plate 27 on the target device is lowered on post 14 until the upper edge 33 is even with the graduation .4' on the S scale 25, as seen in FIG. 1, which now corresponds, in the sense of the above predetermined datum relationships, to the level of the finished center point on top of the pavement at line 7 at the center of the road. The levels of clips 35, 36, 37 indicate in the same sense the desired levels of the concrete, lime treated soil and base soil.

Referring back to the stake 8, the symbol L—.3 indicates that the left quarter point on the highway is to be cut to that degree below the center point. Indicator 78 is moved to registration with the graduation .3 on the sleeve 66 which is .3 feet below the zero index 73 that, in turn, is aligned with the telescope 68 (FIG. 2).

The lower end of the probe 54 is then positioned at the level 1 at the quarter point by thrusting it through the cultivated soil that forms the lime treated layer until the lower end strikes the solid base soil at level 1, and a sighting is taken on the lower clip 37. If the zero index 59 and the indicator 78 are aligned when this sighting is taken, the level 1 will be correct, but if not, then the variation between the actual level and the correct level will appear as a reading at the indicator 78 on the scale on the rod 55.

Again, referring to the stake 8, the symbols R+.3 appears, which means that the right quarter point must be +.3' above the center point, and in this instance the telescope 68 is moved to the bottom holder 69 on the sleeve 66 with the scale 74 facing the operator and the indicator 78 is set at the graduation on the scale 74 reading .3'. Thus when the sleeve 66 is moved to bring the zero index 59 to the indicator 78, it will be above the zero index 75, and when the telescope is sighted on lower clip 37, the lower end of the probe 54 will be above the level of the solid base soil at the center point. At the center point, the indicator 78 must align with the zero indexes 59, 75 or 59, 73 when the telescope is sighted on clip 37 and the probe is seated on the base soil. The test, in all instances, for any desired level of the lower end of the probe, is that with the telescope sighted on the corresponding target clip position, the indicator 78, properly set on level scale 70 or 74, will be aligned with the index 59.

Sightings on clips 35, 36 follow the sighting on clip 37 as the work progresses and the grade stakes 6 may be accurately positioned in a short time without resorting to the calculations heretofore essential. The devices of the present invention enable a quick checking of the different levels for the accuracy of the work.

In FIG. 5 the lower post 53 is extended to permit checking levels below the scope of the device when the post 53 is collapsed. For example, in FIG. 5 the dotted line 83 is the desired level, 1.7 feet below the end member 47. The post 53 has been extended one foot, as shown, and the indicator 78 has been set to .7 foot. When a sighting of the telescope 68 to the top of target 27 by the necessary positioning of sleeve 66 is made, the indicator line 78 crosses the .3 graduation on rod 55 below the zero index 59, clearly showing that the actual level reached at level 84 is .3 foot short of the level 83. If the indicator line 78 were above the zero index 59 the level at the lower end of the rod 54 would be too deep, and the graduation crossed by the indicator line would show the exact deviation from level 83.

FIG. 10 shows what may be the preferred structure for the sleeve that is on rod 55, and in this view the sleeve 85 is approximately double the length of sleeve 66 with the telescope in sighting device 68, which is the same as the sighting device of FIG. 11, at a mid point where the zero index 86 on the sleeve is located. The scales 87, 88 which correspond to scales 70, 74 extend downward and upward from the zero index 86 thus avoiding the necessity for changing the position of the telescope above and below the zero index 59. The indicator 89 is the same as in FIG. 11, but it is adapted to slide the full extent of scales 87, 88.

I claim:
1. Grade setting apparatus comprising:
   (a) a target device including a vertically disposed member having thereon an index mark and a vertically extending row of equally spaced numerals of progressively increasing value in opposite vertical directions from said mark designating successively increased distances from said mark;
   (b) a target supported on said member for vertical movement therealong in opposite directions relative to said mark, and said target including reading means substantially registrable with each of said numerals and said mark in different ones of its position;
   (c) level identifying means on said target spaced below said reading means a distance equal to the difference between a pair of adjacent desired grade levels;
   (d) a sighting device including a vertically elongated element having thereon a zero index and a vertically extending row of equally spaced numbers of progressively increasing value in opposite vertical directions from said zero index designating successively increased distances corresponding to the distances designated by said numerals on said target device;
   (e) vertically elongated means supported on said element for vertical movement on the latter to different distances along said row of numbers;
   (f) a vertical row of digits on said vertically elongated means of successively increasing value including a zero index and corresponding in spacing and value to the zero index and numbers on said element and commencing at said zero index and extending in one direction away therefrom with said vertical row of digits alongside said row of numbers for simultaneous viewing with said numbers;
   (g) a sighting device on said vertically elongated means disposed normal thereto and alongside the second said zero index for viewing said target when said sighting device is positioned on the grade area and the said target device is at a predetermined level adjacent thereto;
   (h) an indicator slidably supported on said vertically elongated means for vertical movement to different positions over said row of digits and said row of numbers for indicating variations that may exist between the level of said level identifying means and the desired level of said grade at the position of said sighting device on said grade area.
2. In apparatus as defined in claim 1:
   (i) means on said target for supporting a plurality of said level identifying means at vertical spacing equal to the desired levels of the base untreated soil, the lime treated soil thereover, the concrete over said lime treated soil, and the finished pavement.
3. In apparatus as defined in claim 1:
   (i) a ground engaging support on the lower end of the vertically elongated member of said target device including means thereon for engaging the upper surface of a hub stake in the ground at one side of the area to be graded; and
   (j) said sighting device including a downwardly extending probe at the lower end thereof having a pointed lower end for thrusting said probe through the cultivated, lime-treated layer of soil in the area being graded to the hard untreated soil on which said layer is supported.
4. In an apparatus as defined in claim 1:
   (i) said row of digits on said vertically elongated means also extending vertically away from said zero index in a direction opposite to said one direction, whereby levels both above and below a desired predetermined grade level may be determined for filling or cutting said grade to a desired predetermined level established on said target device.
5. In grade setting apparatus for use where a grade is to be set a designated distance above or below a fixed point and target means positioned adjacent to the area of said grade has thereon a mark at a known distance above said fixed point plus or minus said designated distance according to whether said distance is designated as being above or below said fixed point, a sighting device which comprises:
   (a) a vertically elongated element having thereon a zero index positionable with said zero index at said known distance above the existing level of said grade area and a vertically extending row of equally spaced number of progressively increasing value in opposite directions from said zero index designating successively increased distances from said zero index;
   (b) vertically elongated means supported on said element for vertical movement on the latter to different distances along said row of numbers;
   (c) a vertical row of digits on said vertically elongated means of successively increasing value including a zero index and corresponding in spacing and value to the zero index and numbers on said element and commencing at said zero index and extending in one direction away therefrom with said vertical row of digits alongside said numbers for simultaneous viewing with said numbers;
   (d) a sighting device on said vertically elongated means disposed normal thereto and alongside the second said zero index for viewing said mark when said sighting device is positioned on said grade area; and
   (e) an indicator slidably supported on said vertically elongated means for vertical movement to different positions over said row of digits and said row of numbers for indicating variations that may exist between the level of said fixed point and the desired level of said grade at the position of said sighting device on said grade area.

References Cited

UNITED STATES PATENTS

| 419,711   | 1/1890  | Rogers.   |
| 1,165,820 | 12/1915 | Watson.   |
| 1,476,430 | 12/1923 | Treloar.  |
| 2,218,418 | 10/1940 | Cain et al. |
| 2,699,140 | 1/1955  | Fisher.   |
| 2,928,176 | 3/1960  | Hallisey. |

FOREIGN PATENTS

| 186,703 | 7/1907  | Germany.      |
| 556,379 | 10/1943 | Great Britain. |

ROBERT B. HULL, Primary Examiner

U.S. Cl. X.R.

33—74